(12) United States Patent
Qiao et al.

(10) Patent No.: US 7,515,910 B2
(45) Date of Patent: *Apr. 7, 2009

(54) CELLULAR/WLAN HYBRID-TERMINAL HANDOVER TECHNIQUES

(75) Inventors: Yi Qiao, Hoffman Estates, IL (US); Fei Wu, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 411 days.

This patent is subject to a terminal disclaimer.

(21) Appl. No.: 11/235,838

(22) Filed: Sep. 26, 2005

(65) Prior Publication Data

US 2007/0072609 A1 Mar. 29, 2007

(51) Int. Cl.
*H04Q 7/20* (2006.01)

(52) U.S. Cl. .............. 455/436; 370/338; 370/331; 455/439; 455/442

(58) Field of Classification Search ........... 375/130; 370/329, 331, 355, 328, 352, 332, 338, 203, 370/401; 455/411, 442, 439, 450; 713/165
See application file for complete search history.

(56) References Cited

U.S. PATENT DOCUMENTS

| | | | | |
|---|---|---|---|---|
| 5,541,415 | A * | 7/1996 | Shonka | 250/374 |
| 5,907,808 | A | 5/1999 | Vaara et al. | |
| 6,456,316 | B1 * | 9/2002 | Jun | 348/21 |
| 6,496,941 | B1 * | 12/2002 | Segal et al. | 714/4 |
| 6,700,919 | B1 * | 3/2004 | Papasakellariou | 375/130 |
| 7,039,027 | B2 * | 5/2006 | Bridgelall | 370/329 |
| 7,209,712 | B2 * | 4/2007 | Holtzman | 455/67.13 |
| 7,269,234 | B2 * | 9/2007 | Klingenbrunn et al. | 375/340 |
| 2002/0085516 | A1 * | 7/2002 | Bridgelall | 370/329 |
| 2003/0007473 | A1 * | 1/2003 | Strong et al. | 370/338 |
| 2003/0031231 | A1 * | 2/2003 | You et al. | 375/133 |
| 2003/0148766 | A1 * | 8/2003 | Inoguchi et al. | 455/450 |
| 2004/0047323 | A1 * | 3/2004 | Park et al. | 370/338 |
| 2004/0057394 | A1 * | 3/2004 | Holtzman | 370/317 |
| 2004/0068571 | A1 * | 4/2004 | Ahmavaara | 709/228 |
| 2004/0157560 | A1 * | 8/2004 | Yamasaki | 455/63.1 |
| 2004/0170154 | A1 * | 9/2004 | Carter et al. | 370/338 |
| 2004/0185887 | A1 * | 9/2004 | Wolman et al. | 455/516 |
| 2005/0113149 | A1 * | 5/2005 | Tamura et al. | 455/569.1 |
| 2005/0128998 | A1 * | 6/2005 | Jelitto et al. | 370/349 |
| 2005/0141456 | A1 * | 6/2005 | Shaheen | 370/331 |
| 2005/0163070 | A1 * | 7/2005 | Farnham et al. | 370/328 |
| 2005/0186948 | A1 * | 8/2005 | Gallagher et al. | 455/414.1 |
| 2005/0233700 | A1 * | 10/2005 | Pecen et al. | 455/67.11 |

(Continued)

FOREIGN PATENT DOCUMENTS

WO WO 02/054820 A 7/2002

(Continued)

OTHER PUBLICATIONS

Mark Edward Pecen, System Selection In Wireless Communications Networks, U.S. Appl. No. 10/824,550, filed Apr. 14, 2004.

*Primary Examiner*—Rafael Pérez-Gutiérrez
*Assistant Examiner*—Joseph Arévalo
(74) *Attorney, Agent, or Firm*—Roland K. Bowler, II

(57) ABSTRACT

Real-time handover decision techniques are provided which can utilize prior known system behavior in making a handover decision to avoid averaging delay and hysteresis delay.

19 Claims, 9 Drawing Sheets

U.S. PATENT DOCUMENTS

| | | | |
|---|---|---|---|
| 2005/0266853 A1* | 12/2005 | Gallagher et al. | 455/439 |
| 2006/0007889 A1* | 1/2006 | Khan | 370/331 |
| 2006/0034236 A1* | 2/2006 | Jeong et al. | 370/338 |
| 2006/0072507 A1* | 4/2006 | Chandra et al. | 370/332 |
| 2006/0084444 A1* | 4/2006 | Kossi et al. | 455/450 |
| 2006/0111115 A1* | 5/2006 | Marin et al. | 455/442 |
| 2006/0159003 A1* | 7/2006 | Nanda et al. | 370/203 |
| 2006/0221933 A1* | 10/2006 | Bauer et al. | 370/352 |
| 2006/0291455 A1* | 12/2006 | Katz et al. | 370/355 |

FOREIGN PATENT DOCUMENTS

WO    WO 2004/068797 A    8/2004

* cited by examiner

US 7,515,910 B2

CELLULAR/WLAN HYBRID-TERMINAL HANDOVER TECHNIQUES

FIELD OF THE DISCLOSURE

The present invention generally relates to communications, and more particularly to handover decision techniques for hybrid cellular/WLAN wireless communication devices (WCDs) operable in either a cellular or WLAN system.

BACKGROUND

Hybrid wireless cellular communications devices (WCDs) are capable of communicating on both cellular networks and in broadband wireless networks, such as, 802.11 protocol-based or WLAN-based networks. As the WCD moves physically and/or the fading channel changes due to subtle variations in the complexity of the physical surroundings, the WCD supports a specific set of logical decision-making capabilities which determine how a cell and/or network will be selected. Generally, a hybrid WCD may detect and select one network or the other, or both.

Broadband wireless communication protocols support radio resource management techniques for detecting one or more operating frequencies and access points. A cellular system, such as Global System for Mobile telecommunication (GSM), however, has little in common with alternate radio access interfaces, for example, a standardized WLAN like 802.11 or other wireless technologies which are capable of operating over unlicensed spectrum. The differences in radio behavior result primarily from differences in operating bandwidths, power limitations for unlicensed operation, Medium Access Control (MAC) protocols designed to handle different predominant traffic types, frequency ranges of operation and radio propagation characteristics for licensed/unlicensed operation.

When WCD moves from a cellular network operating at one radio frequency (RF) to another network (e.g., WLAN) operating at another radio frequency (RF), or vice-versa, it is often necessary for the WCD to undergo a hard handover (or "handoff") from the cellular network to the other network, or vice-versa. There are a number of inter-system (or inter-frequency) handover techniques for making this happen.

Handover performance can be analyzed in terms of variables such as unnecessary handovers and processing delay time in making a handover decision. It is desirable to reduce both of these variables. A short signal averaging time may result in an increase in unnecessary handovers, while a long averaging time may result in a failure to detect a necessary handover. In most, if not all, inter-system handover techniques, the processing delay and stability are important considerations which can affect system performance.

To address these issues, an averaging window (AW) can be utilized to accumulate a certain number of Channel Quality Measurement (CQM) samples over a given time frame. The CQM samples are then averaged to provide an estimate of the current CQM. For example, according to one approach, a current estimated channel quality measurement/metric (CQM) is calculated by using a real-time window to obtain previous actual CQM samples, P(i), and then averaging the previous actual CQM samples P(i) to obtain current estimated CQM. The number of CQM samples needed to make a reasonable estimate of the current CQM varies depending on the system. However, regardless of the system, it takes a certain amount of time to accumulate the CQM samples. The time required to accumulate the CQM samples introduces some delay into estimating the current CQM. This delay can be referred to as "averaging" or "accumulation" delay. This "averaging" delay can slow down a handover decision making process and possibly disrupt the service. Thus, with such handover techniques, there is a tradeoff between the number of CQM samples needed to accurately reflect the average performance of the system and the time required to accumulate the CQM samples.

Introduction of a hysteresis level can improve the stability of the handover and help ensure that necessary handover occurs, while the unnecessary handovers are reduced. This helps to reduce "ping-pong" type handovers. However, application of the hysteresis level results in a "hysteresis" delay in making the handover decision which can impact the speed of the handover. Thus, it is desirable to keep this "hysteresis" delay as small as possible.

Notwithstanding these advances, it would be desirable to further reduce and/or eliminate the effects of averaging delay and hysteresis delay when making a handover decision. Other features and characteristics of the present disclosure will become apparent from the subsequent detailed description and the appended claims, taken in conjunction with the accompanying drawings and this background of the invention.

BRIEF DESCRIPTION OF THE DRAWINGS

The present disclosure will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
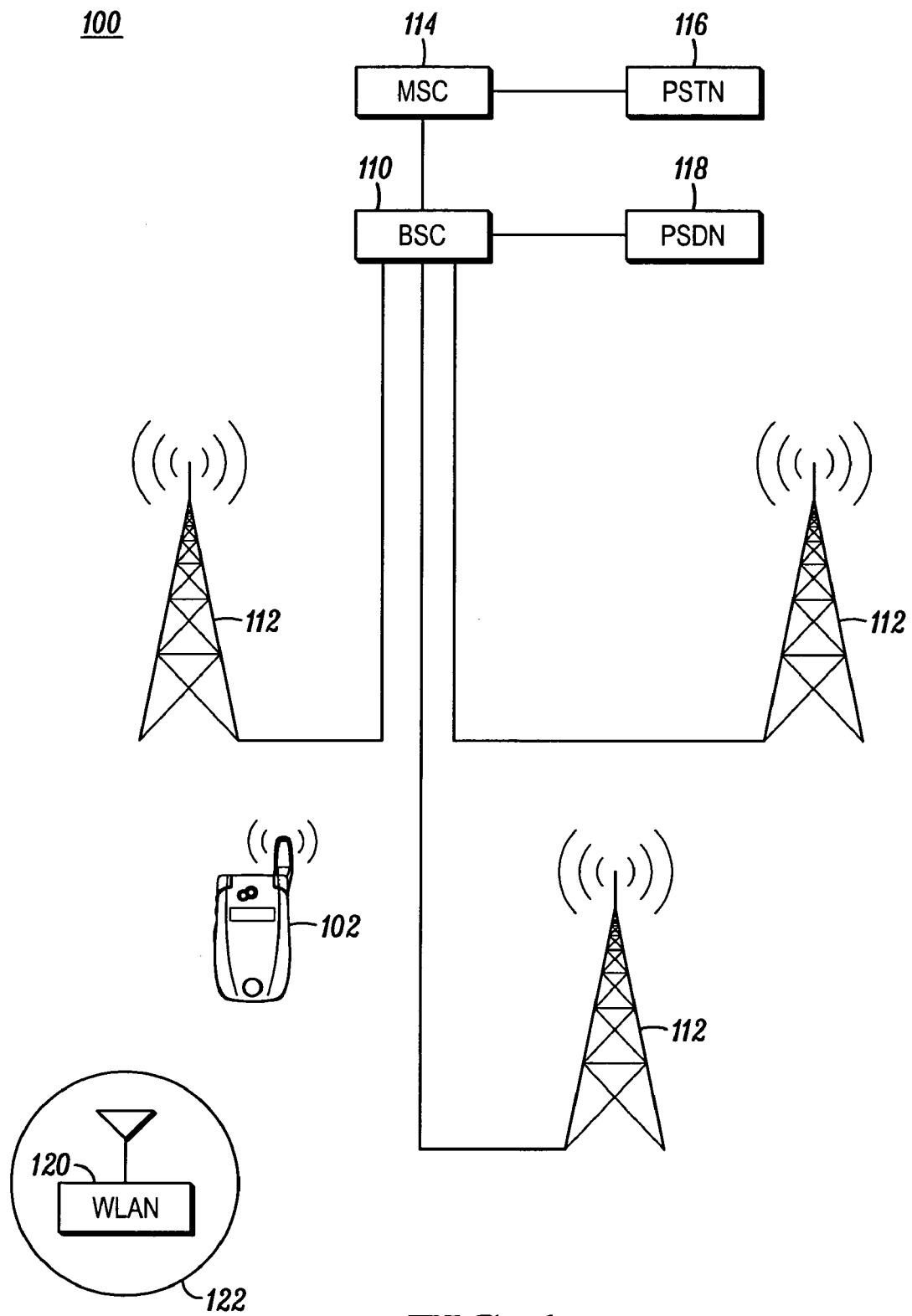
FIG. 1 illustrates a hybrid wireless communications device operating in a wireless communications network comprising first and second communication systems.

FIG. 1 illustrates a hybrid wireless communications device 102 operating in a wireless communications network 100 comprising first and second generally different communication systems. The exemplary first system is a cellular communications network or system, for example, a Global System for Mobile communications (GSM) comprising a base station controller (BSC) 110 coupled to a plurality of base transceiver stations (BTS) 112 and to a mobile switching center (MSC) 114 interconnecting the BSC to a Public Switched Telephone Network (PSTN) 116. The exemplary cellular communications system is coupled to a data network, for example, a General Packet Radio Service (GPRS) or some other Packet/Public Switched Data (PSDN) 118 network by infrastructure well known to those having ordinary skill in the art. The exemplary cellular communications system may also be coupled to other entities and infrastructure, for example, messaging and/or presence servers not illustrated but also well known by those having ordinary skill in the art. In other embodiments, the cellular communications network may be some other protocol network, for example, a CDMA network or a $3^{rd}$ Generation (3G) W-CDMA network, or a combination of 2G and 3 G networks, among others.

In FIG. 1, the exemplary second system is a broadband wireless communications network, for example, a wireless local area network (WLAN) 120. Alternatively, the broadband wireless communications network may be a canopy or other fixed wireless network. The broadband wireless network may be proprietary or standardized protocol, for example, an 802.11 protocol network or some other wireless technology capable of meeting the requirements of operation in unlicensed spectrum. In other embodiments, more generally, the second system may be some other network, which is generally isolated relative to the cellular network.

Figure 2:
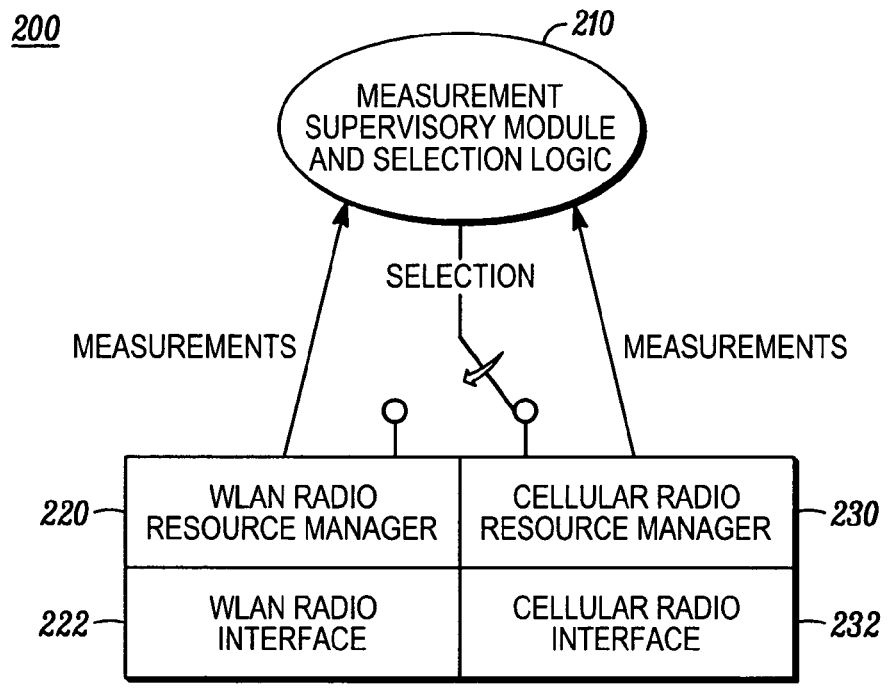
FIG. 2 illustrates a portion of a wireless communications device (WCD) architecture.

FIG. 2 illustrates a portion of a wireless communications device architecture 200 comprises a supervisory entity 210 that manages wireless signal measurements and communications system selection logic. The exemplary architecture includes a WLAN radio resource manager 220 coupled to a WLAN radio interface 222 and a cellular radio resource manager 230 coupled to a cellular radio interface 232 that will be WLAN URR The radio resource managers 220 and 230 communicate signal measurements to the management entity 210, and the management entity controls the selection and monitoring of the first and second radio systems based on signal measurement information, as discussed further below. In other embodiments, the radio resource management and interface entities may be different than those of the exemplary embodiment.

The disclosed embodiments relate to real-time handover decision techniques which can utilize prior known system behavior in making a handover decision to avoid averaging delay and hysteresis delay. According to these techniques, incoming system channel quality measurements (CQMs) can be processed in real-time. To assist in handover decision making, a real-time virtual window (VW) or time sliding window (TSW) is provided, and a measure of the VW is defined. The VW is a virtual averaging window in which averaging takes place in real time. The VW is time dependent and is characterized by its size in samples.

A current estimated CQM is defined over the current VW and obtained based on the current CQM and previously CQEs within the current VW. To determine a current channel quality estimate, the VW combines the current instantaneous channel quality measurement, CQM(i), and previous estimated channel quality measurements (CQEs).

The size of the VW can be adjusted based on the time-dependent channel quality. A smaller sized VW can be used for better channel conditions, while a larger sized VW can be used for worse channel conditions. A VW metric can be defined as the mean of the CQEs within the VW. The VW metric is obtained as soon as the current CQE becomes available. The VW eliminates the need to accumulate the channel quality measurement/metric (CQM) samples. As a result, the delay typically associated with this accumulation can be eliminated and the CQM estimation takes place in real time (e.g., it does not require any time because the estimation of the current CQM is done instantaneously.) In other words, because the instantaneous CQM and prior or previous estimated CQMs samples are used to generate the current estimated CQM, there is no averaging delay or "waiting" because the only information needed to estimate the current CQM is the current instantaneous CQM sample. Thus, when the current CQM sample is obtained at a given time instant, its corresponding CQM estimation (e.g., the estimated CQM) is known, and therefore the estimation is "instantaneous" or in real time.

Figure 3:
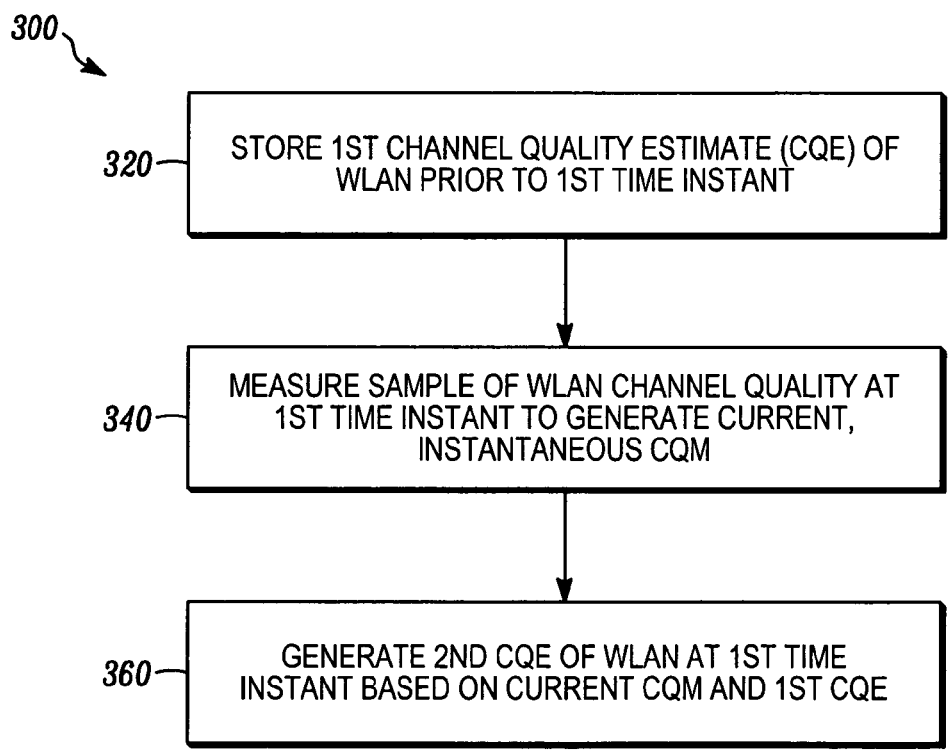
FIG. 3 is a flowchart of a handover decision technique according to an exemplary embodiment.

FIG. 3 is a flowchart of a handover decision technique 300 according to an exemplary embodiment for deciding when to handover a communication device from a wireless communication network to a wireless local area network (WLAN) in real-time. The handover decision technique 300 can be implemented in a wireless communication device (WCD). At step 320, a first channel quality estimate (CQE) of the WLAN is stored prior to a first time instant (i). Thereafter, at step 340, a sample of WLAN channel quality is measured at the first time instant to generate a current, instantaneous CQM. At step 360, a second channel quality estimate (CQE) of the WLAN is generated at the first time instant (i) (e.g., in real-time) based on the current CQM and the first CQE.

Figure 4:
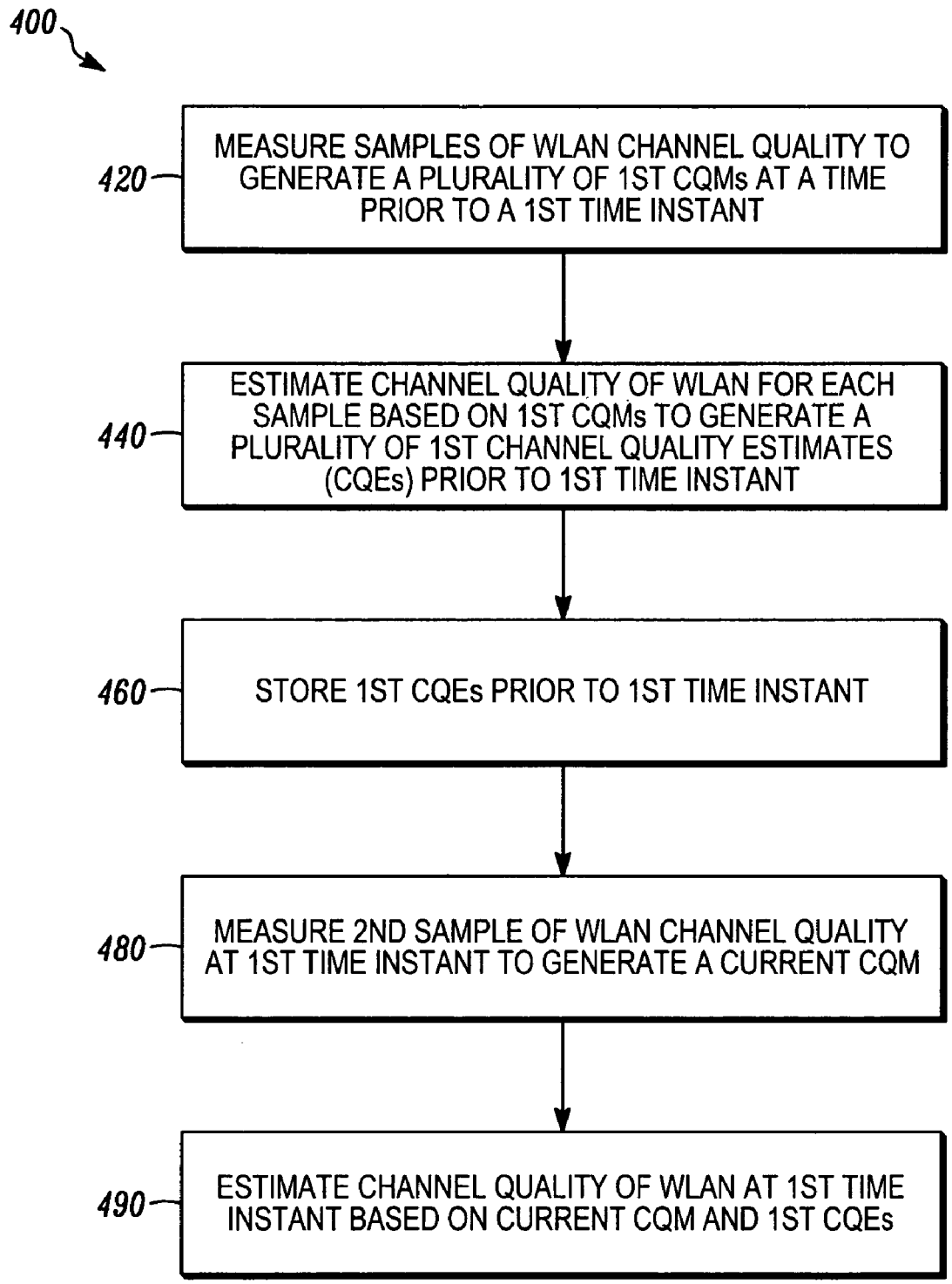
FIG. 4 is a flowchart of a handover decision technique according to another an exemplary embodiment.

FIG. 4 is a flowchart of a handover decision technique 400 according to another an exemplary embodiment for deciding when to handover a communication device from a wireless communication network to a wireless local area network (WLAN) in real-time. The handover decision technique 400 can be implemented in a wireless communication device (WCD). At step 420, samples of WLAN channel quality are measured to generate a plurality of first CQMs at a time prior to a first time instant (i). Based on the first CQMs, at step 440, channel quality of the WLAN is estimated for each sample to generate a plurality of first channel quality estimates (CQEs). At step 460, the first CQEs are stored. Steps 420-440 each take place prior to a first time instant (i). Next, at step 480, a second sample of WLAN channel quality is measured at the first time instant (i) to generate a current CQM. At step 490, channel quality of the WLAN is estimated at the first time instant (i) based on the current CQM and the first CQEs.

Figure 5:
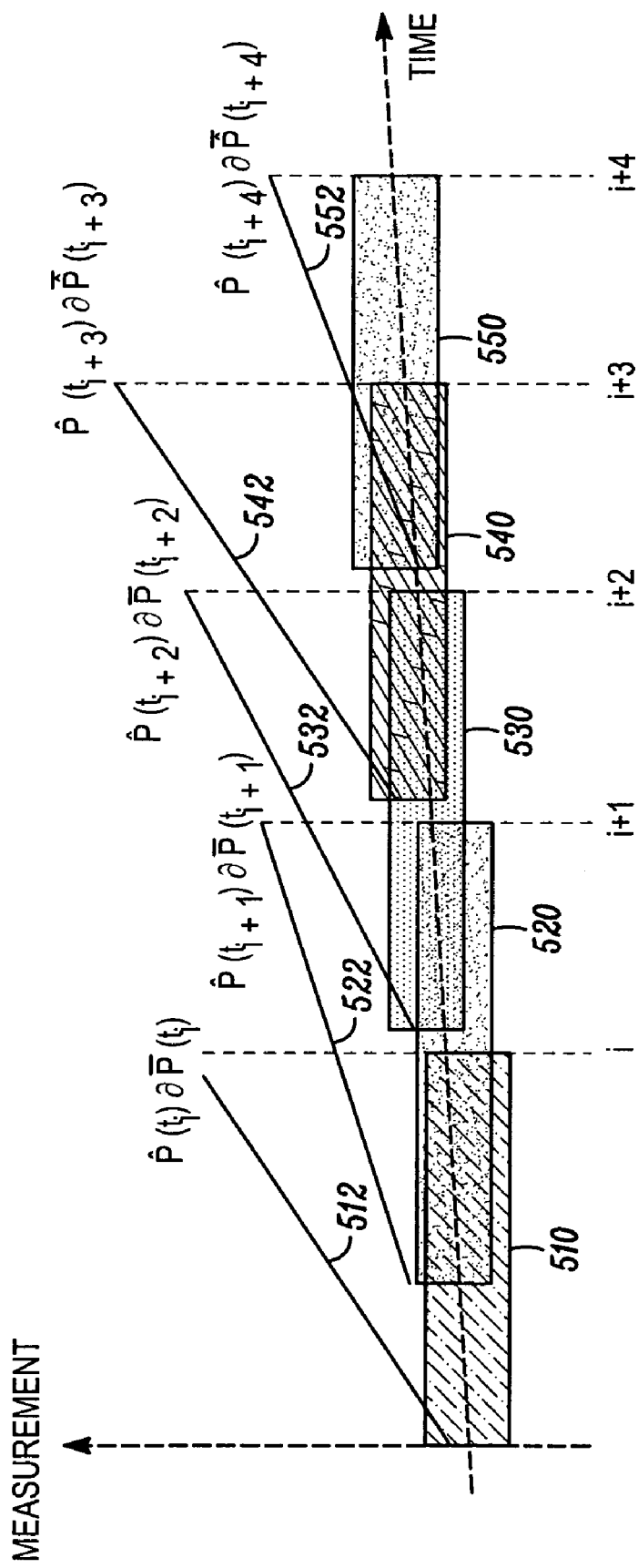
FIG. 5 is a graph showing the use of a WLAN virtual window (VW) to estimate channel quality measurements (CQM) at different time instances (i, i+1, i+2, i+3, i+4, ... ) according to an embodiment.

FIG. 5 is a graph showing the use of a WLAN virtual window (VW) to estimate channel quality measurements (CQM) (or generate channel quality estimates (CQEs)) at different time instances (i, i+1, i+2, i+3, i+4, . . . ) according to an embodiment. This graph describes the logical flow of CQM data in terms of a virtual window (VW) which changes positions 510, 520, 530, 540, 550 at each time instant (i, i+1, i+2, i+3, i+4, . . . ). The VW metric is the mean of the CQEs within a time averaging window.

In one embodiment, the VW is time dependent and is characterized by its size in samples (m). A VW of sample size m at time instant i can be defined as:

$$VW(i)=\{CQE(i-m+1), CQE(i-m+2), \ldots, CQE(i-1), CQM(i)\} \quad \text{(Equation 1)}$$

A current estimated CQM is defined over the current VW and obtained based on the current CQM and previously CQEs within the current VW. The VW(i) combines the current instantaneous channel quality measurement, CQM(i), and up to i−m+1 previous estimated channel quality measurements (CQEs). The VW eliminates the need to accumulate the channel quality measurement/metric (CQM) samples. As a result, the delay typically associated with this accumulation can be eliminated and the CQM estimation takes place in real time (e.g., it does not require any time because the estimation of the current CQM is done instantaneously.) In other words, because the instantaneous CQM and prior or previous estimated CQM samples are used to generate the current estimated CQM, there is no averaging delay or "waiting" because the only information needed to estimate the current CQM is the current instantaneous CQM sample. Thus, when the current CQM sample is obtained at a given time instant, its corresponding CQM estimation (e.g., the estimated CQM) is known, and therefore the estimation is "instantaneous" or in real time.

A metric of the VW(i) can be defined by the mean of the CQEs within the VW, that is:

$$\text{metric}(VW(i)) = \frac{\sum_{j=0}^{m_i-1} CQE(i-j)}{m_i} \quad \text{(Equation 2)}$$

As shown in FIG. 5, at each time instant (i, i+1, i+2, i+3, i+4, ... ), a VW having a certain window size (m) can be defined, where (m) is the number of samples per VW. This VW contains one current CQM(i) and up to i−m+1 previous CQEs. The window size (m) of this time window or "time slice" is adjustable depending on the channel condition at that time instant (i, i+1, i+2, i+3, i+4, ... ). The window size (m) can change depending on the channel condition at time instant (i). For example, in one embodiment, the size (m) of the VW defined at each time instant (i, i+1, i+2, i+3, i+4, ... ) can vary as a function of time, and can be different at each time instant (i, i+1, i+2, i+3, i+4, ... ) depending on the channel conditions at that time instant. Prior to time instant (i), a total of m−1 prior CQEs have already been previously determined and stored. As described below with reference to FIG. 6, the m−1 prior CQEs can be used in conjunction with a current CQM to obtain a current CQE. At each position 510, 520, 530, 540, 550 of the VW, a current Channel Quality Estimate (CQE) can be calculated. In this sense, this time window is a "virtual" window because the samples used within this window to estimate the current CQE are prior CQEs and not "actual" CQMs.

Referring again to FIG. 5, an initial CQM is made a time (0). At time instant (i) the VW is at position 510, and a VW with window size of M is defined. During the time interval between the CQM at the first time instant (i) and another CQM at the second time instant (i+1), the VW slides from position 510 to position 520 and the window size (m) can change or be adjusted based on the measured channel conditions (CQM) at the first time instant (i).

During the time interval between the CQM at the second time instant (i+1) and another CQM at the third time instant (i+2), the VW slides from position 520 to position 530 and the window size (m) can change based on the measured channel conditions (CQM) at the second time instant (i+1).

During the time interval between the CQM at the third time instant (i+2) and another CQM at the fourth time instant (i+3), the VW slides from position 530 to position 540 and the window size (m) can change based on the measured channel conditions (CQM) at the third time instant (i+3).

During the time interval between the CQM at the fourth time instant (i+3) and another CQM at the fifth time instant (i+4), the VW slides from position 540 to position 550 and the window size (m) can change based on the measured channel conditions (CQM) at the fourth time instant (i+4).

The lines 512, 522, 532, 542 and 552, which indicate how much the average behavior of VW is changing at position 510, how much average behavior of VW is changing at position 520, how much average behavior of VW is changing at position 530, etc.

FIG. 6 is a flowchart of a handover decision technique 600 according to an exemplary embodiment. The handover decision technique 600 can be used for deciding when to handover a wireless communication device (WCD) from a wireless communication network to a wireless local area network (WLAN). This handover decision technique can be implemented in a wireless communication device (WCD) and/or radio access network.

Figure 6A:
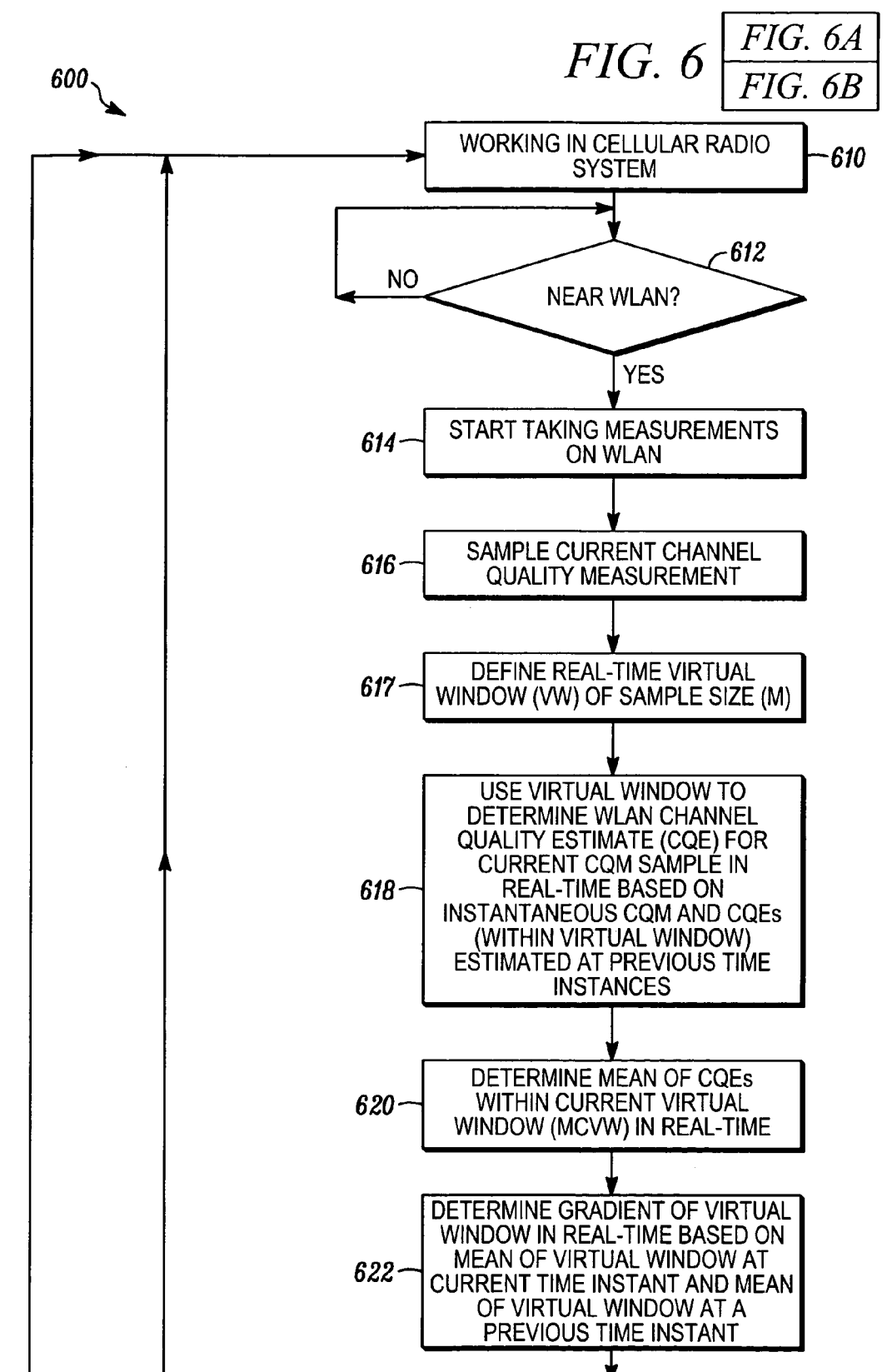
FIG. 6 is a flowchart of a handover decision technique according to yet another an exemplary embodiment.

Referring to FIG. 6A, the process beings at step 610 with a WCD operating in a cellular radio system, such as a GSM, GPRS, CDMA, UMTS or WCDMA based system. At step 612, the WCD determines whether or not it is near a WLAN, such as, a network which complies with IEEE 802.11 standards. The WCD continues searching for a WLAN signal until the WCD determines that it is near a WLAN. The WCD can use any of several known techniques for detecting the WLAN signal.

When the WCD determines that it is near a WLAN, it begins measuring the WLAN channel quality at step 614. At step 616, the WCD begins sampling current Channel Quality Measurements (CQMs). The current CQM sample reflects channel quality of the WLAN at a discrete time instance. A CQM can include, but is not limited to, a received signal strength (RSS) measurement, a power measurement, a bit error rate (BER), a frame error rate (FER), a block error rate (BER), received signal power (RX Power), or other indicia of channel quality of the WLAN signal.

To assist in handover decision making, at step 617, a real-time virtual window (VW) is defined. The VW is time dependent and is characterized by its size in samples (m). A VW of sample size m at time instant i can be defined by the current instantaneous channel quality measurement from step 616 and previous estimated channel quality measurements (CQEs) stored in the WCD. Instead of using the actual CQM samples to estimate the current CQM, the VW uses previous estimated CQMs to estimate the current CQM at that instant. The VW eliminates the need to accumulate the channel quality measurement/metric (CQM) samples. As a result, the delay typically associated with this accumulation can be eliminated and the CQM estimation can take place in real time (e.g., it does not require any time because the estimation of the current CQM is done instantaneously.)

At step 618, the WLAN channel quality is estimated for the current CQM sample in real-time using the VW. A current instantaneous CQM estimate (CICQME) or "current estimated CQM" can be defined over the VW. The current instantaneous CQM estimate (CICQME) or "current estimated CQM" can be obtained based on the current or instantaneous channel quality measurement (CQM) from step 616, prior CQEs (e.g., estimated CQMs at previous time instances as opposed to actual CQM samples) within the VW that have been determined by the WCD prior to step 616, and the number of samples per VW.

When the current CQM sample is obtained at a given time instant, its corresponding CQM estimation (e.g., the estimated CQM or CQE) is known because the previous estimated CQMs (CQEs) are available for all prior time instances. As such the estimation is "instantaneous" or in real time since the estimated CQM at the present time instant can be determined at the present time. Thus, the system's prior knowledge of estimated CQMs (e.g., CQMs estimated at previous time instances) can be used to arrive at a current estimated CQM at the current time instance.

This eliminates the need to wait to collect CQM samples before calculating an estimated CQM. Thus, because no time is required to accumulate CQM samples, the averaging delay in estimating the current CQM can be eliminated. There is no averaging delay or "waiting" because the only information needed to estimate the current CQM is the current instantaneous CQM sample. By contrast, in conventional handover techniques, the system must collect a number of CQM samples (or current instantaneous CQMs) over a time period, and then average those CQM samples to determine a current CQM estimate. This conventional technique introduces averaging delay.

Moreover, because the previous estimated CQM samples are used to estimate the current CQM, the number of previous estimated CQM samples used to estimate the current CQM can be increased as needed to improve the accuracy of the estimate of the current CQM without introducing any delay.

It would also be desirable to reduce and/or eliminate hysteresis delay and ensure that the handover decision process is stable since this helps reduce "ping-pong" type handover situations. To accomplish this, a new metric known as the gradient of the mean of the virtual window (GMCVW) can be defined, as will be discussed below with reference steps 620 and 630.

At step 620, the mean of the current virtual window (MCVW) at the current time instant is determined in real-time by determining the mean of the CQEs within the VW. In one implementation, the mean of the current virtual window (MCVW) is a function of the CQEs within the VW, number of samples per VW, and time difference ($\Delta t$). In one implementation, the mean of the estimated CQM samples is the mean of the total CQEs within the VW including the current estimated CQE.

At step 622, the mean of the current virtual window (MCVW) can be used to calculate or determine a VW gradient in real-time. The gradient of the VW is a function of the mean of the current virtual window (MCVW) at a current time instant, the mean of the virtual window at a previous time instant, and time difference ($\Delta t$). The gradient describes the trend of the channel quality.

In contrast to an instantaneous estimated sample gradient (or instantaneous sample change), the gradient of the mean of the virtual window (GMCVW) provides a metric of the rate of change of the mean of the current virtual window (MCVW) at a current time instant. The VW gradient provides an accurate measure of the VW's stability since it measures the rate at which the average behavior of each VW is changing. This tends to average out disturbances and can eliminate hysteresis delay which can help to ensure handover stability when determining whether or not to handover.

Figure 6B:
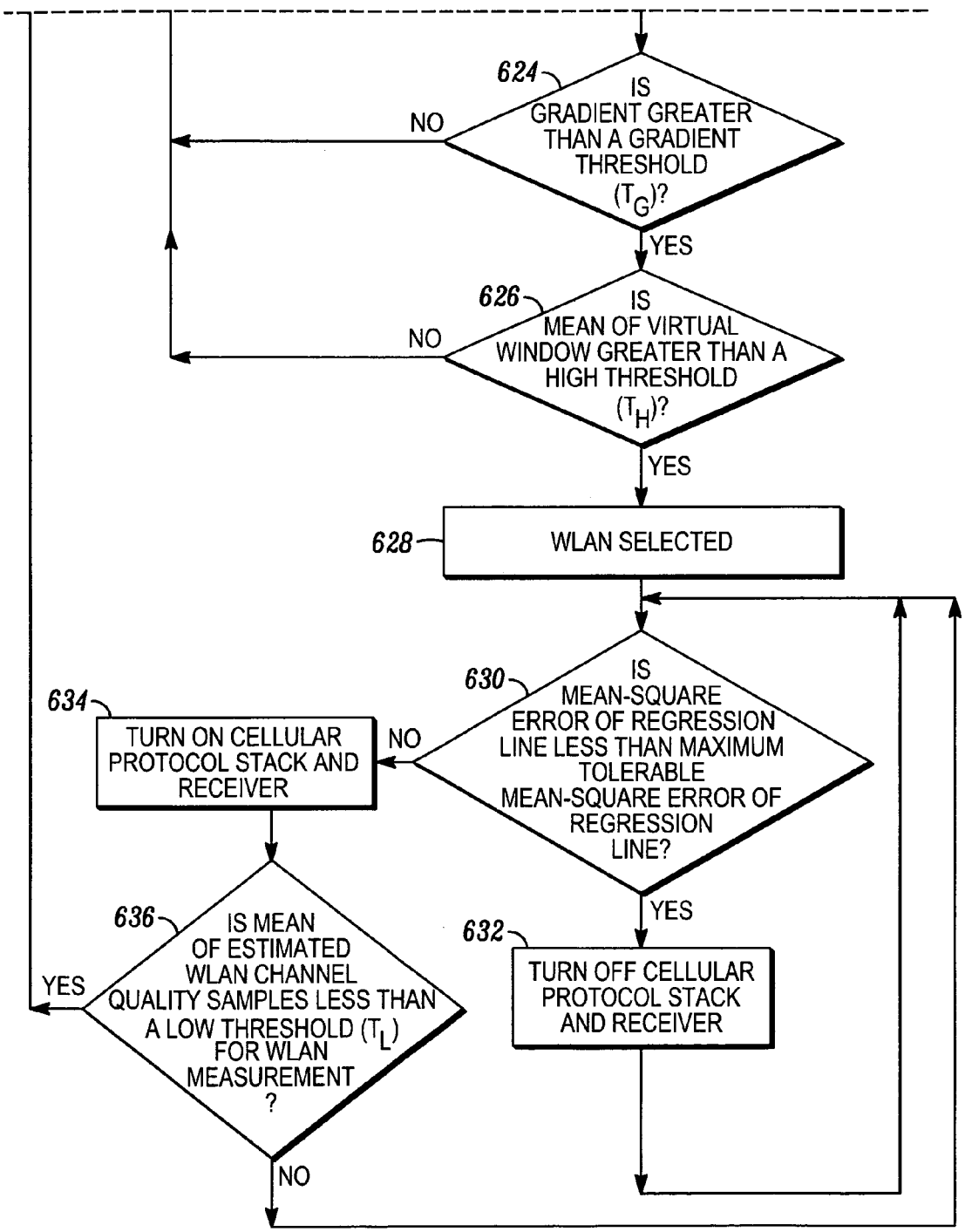

Referring to FIG. 6B, at step 624, the gradient can be compared to the gradient threshold ($T_g$). The gradient threshold ($T_g$) of the WLAN measurement indicates a potential entrance of the WCD into WLAN radio system. The WCD decides that the WLAN is a candidate WLAN for handover if the gradient is greater than the gradient threshold (Tg), and proceeds to step 626. Thus, the WCD can determine whether the change of estimated CQM is fast enough for the WCD to further consider a handover decision.

At step 626, the mean of the current virtual window (MCVW) from step 620 is compared to a high threshold ($T_h$) for the candidate WLAN. The high threshold ($T_h$) for WLAN measurement indicates suitability for the WCD to enter the candidate WLAN.

If the WCD determines that the mean of the current virtual window (MCVW) at a current time instant is greater than the high threshold ($T_h$), (e.g., the WLAN signal is strong enough), then at step 628 the WCD determines that the candidate WLAN is suitable for handover and selects the candidate WLAN as a "selected" WLAN.

The WCD also determines a regression line for the CQM for the selected WLAN. After the WCD selects the WLAN as a selected WLAN, a mean-square error of regression line ($\epsilon$) and the maximum tolerable mean-square error of regression line ($\epsilon_{Max}$) are determined. The mean-square error of regression line ($\epsilon$) reflects changes in mobility of the WCD once the WCD is operating in the selected WLAN. In some situations, the WLAN signal may not be adequate and it becomes prudent for the WCD to continue operating in conjunction with the cellular system. To ensure that it is still desirable to be operating in the selected WLAN, at step 630, the mean-square error of regression line ($\epsilon$) is compared to the maximum tolerable mean-square error of regression line ($\epsilon$Max).

Figure 7:
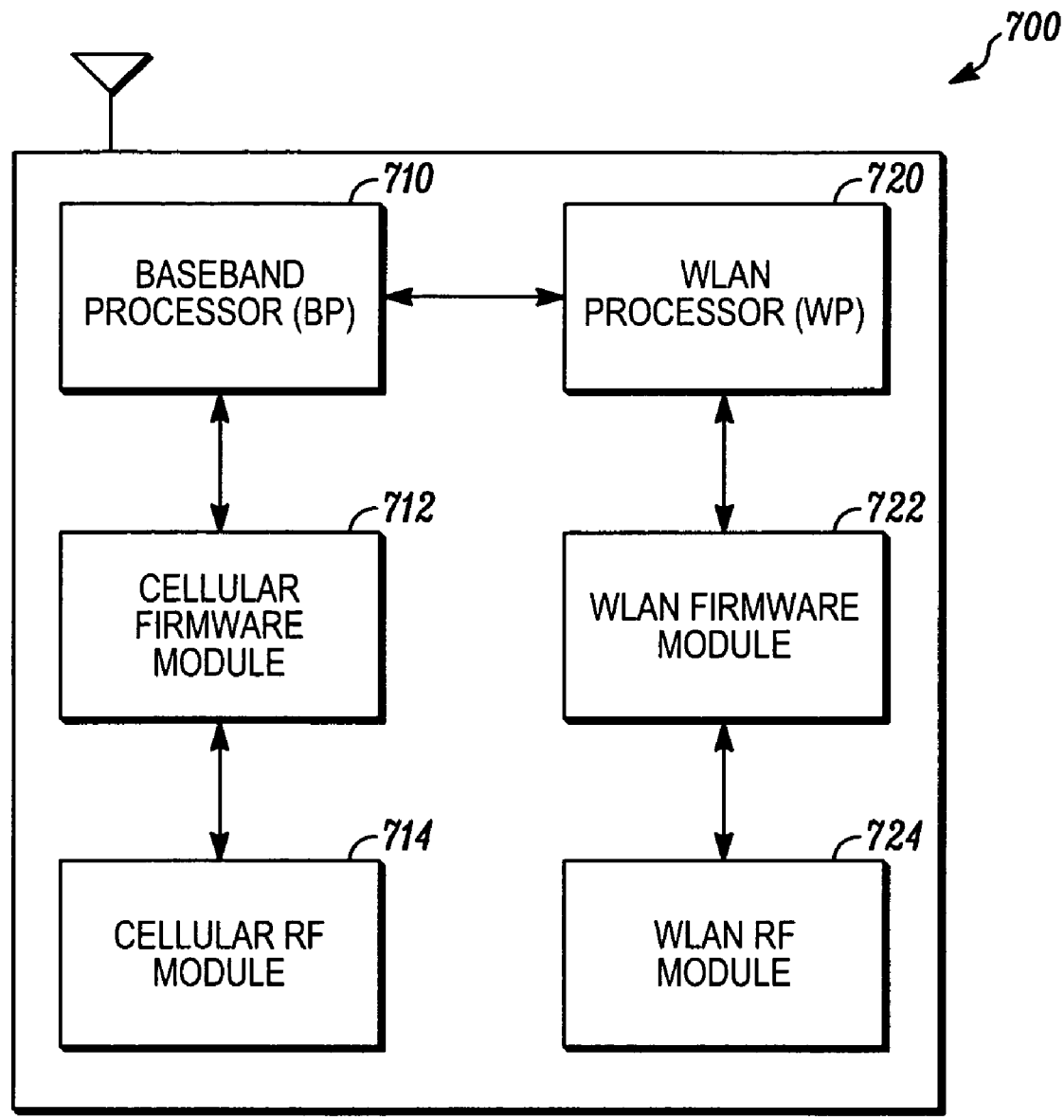
FIG. 7 is a block diagram showing components and modules of a wireless communication device (WCD)

FIG. 7 is a block diagram showing components and modules of a wireless communication device (WCD) 700. The WCD 700 has a baseband processor (BP) 710 and a WLAN processor (WP) 720. The baseband processor (BP) 710 can be, for example, a GSM, GPRS, CDMA, UMTS or WCDMA or other cellular processor which operates in conjunction with its associated software modules or protocol stacks (not shown), firmware modules 712, and RF modules 714. The WLAN processor (WP) 720 also operates in conjunction with its associated software modules or protocol stacks (not shown), firmware modules 722, and RF modules 724. Each of the processors can include other components or modules which are not shown for simplicity of illustration, such as, memory modules, estimator modules, and measurement modules.

Returning to FIG. 6B, if the WCD determines that the mean-square error of regression line ($\epsilon$) is less than the maximum tolerable mean-square error of regression line ($\epsilon_{Max}$) at step 630, then at step 632, the WCD decided that its mobility is negligible and that it should continue operating on the selected WLAN. At this time, the WCD keeps its WLAN processor and receiver and its WLAN software protocol stacks operational, and turns off its cellular baseband processor and receiver and its GSM, GPRS, CDMA, UMTS or WCDMA software/protocol stacks to conserve power. The process then loops back to step 630, where the WCD continues to compare the mean-square error of regression line ($\epsilon$) to the maximum tolerable mean-square error of regression line ($\epsilon_{Max}$).

By contrast, if the WCD determines that the mean-square error of regression line ($\epsilon$) is greater than the maximum tolerable mean-square error of regression line ($\epsilon_{Max}$) at step 630, then at step 634, the WCD can determine that its mobility is significant and that it should discontinue operating on the selected WLAN. At this time, the WCD turns on its cellular baseband processor and receiver and its GSM, GPRS, CDMA, UMTS or WCDMA software protocol stacks, and turns off its WLAN processor and receiver and its WLAN software protocol stacks to conserve power.

At step 636, the WCD determines whether the mean of the estimated WLAN channel quality samples from step 620 is less than a low threshold ($T_l$) for WLAN measurement. The low threshold ($T_l$) indicates unsuitability for mobile terminal remain on WLAN radio system. If at step 636, the mean of the estimated WLAN channel quality samples is greater than the second threshold, then the process returns to step 630, where the WCD continues to compare the mean-square error of regression line ($\epsilon$) to the maximum tolerable mean-square error of regression line ($\epsilon_{Max}$). By contrast, if the mean of the estimated WLAN channel quality samples is less than the second threshold at step 636, then the process returns to step 610 and a connection to the cellular radio system is maintained.

The handover decision technique 600 of FIG. 6 could be implemented in a variety of ways. One exemplary implementation will now be described with reference to FIG. 8.

FIG. 8 is a flowchart of an implementation of the handover decision technique 800 of FIG. 6. The handover decision technique is for deciding when to handover a wireless communication device (WCD) from a wireless communication network to a wireless local area network (WLAN). This handover decision technique can be implemented in a wireless communication device (WCD) and/or radio access network.

Figure 8A:
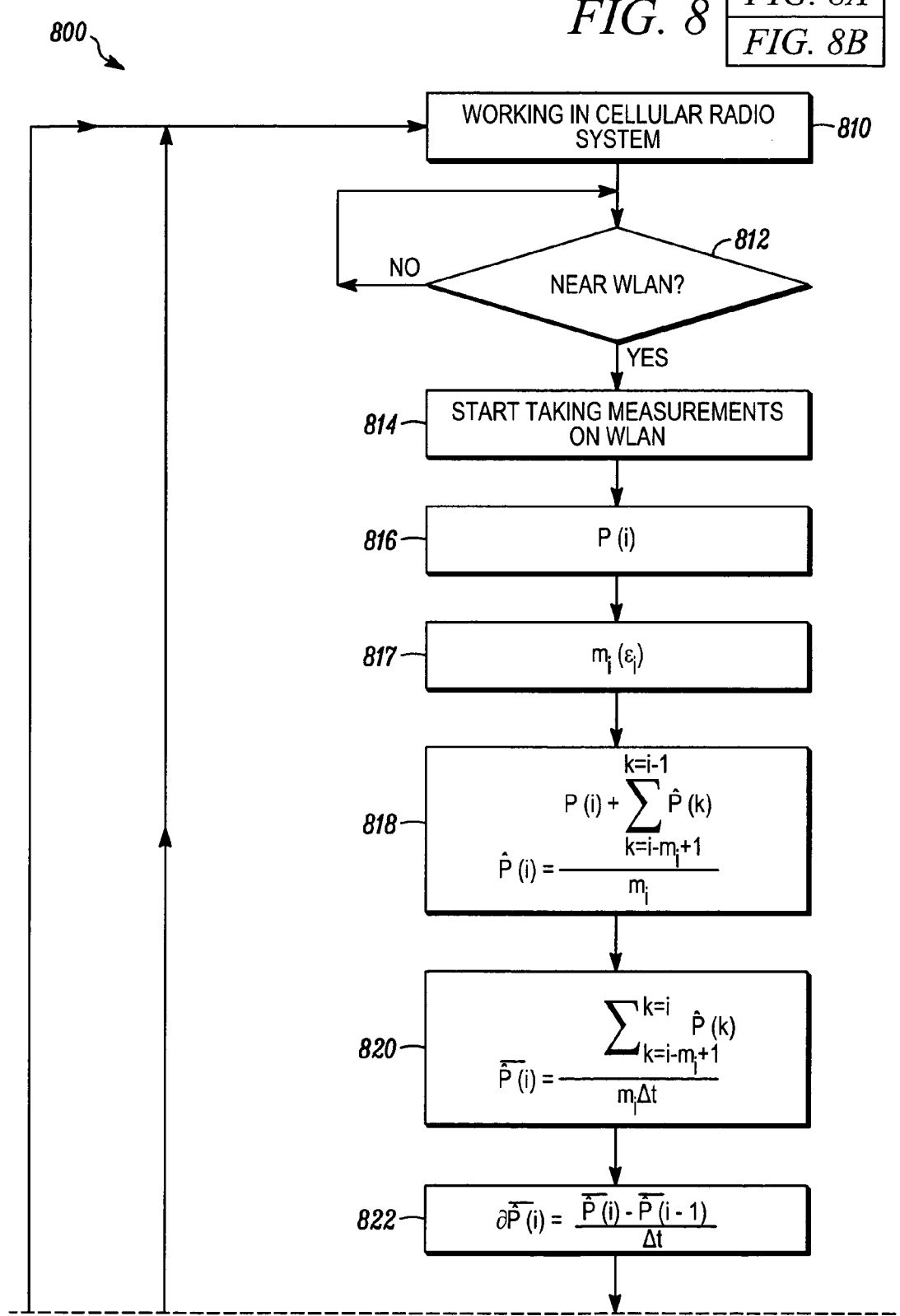
FIG. 8 is a flowchart of an implementation of the handover decision technique of FIG. 6.

Referring to FIG. 8A, the process beings at step 810 with a WCD operating in a cellular radio system, such as a GSM, GPRS, CDMA, UMTS or WCDMA system. At step 812, the WCD determines whether or not it is near a WLAN, such as, a network which complies with IEEE 802.11 standards. This process continues until the WCD determines that it is near a WLAN. The WCD can use any of several known techniques for detecting the WLAN.

When the WCD determines that it is near a WLAN, it begins measuring the WLAN channel quality at step 814. At step 816 the WCD begins taking samples of current CQMs, CQM(i) or P(i). A CQM(i) or P(i) can include, but is not limited to, a received signal strength (RSS) measurement, a power measurement, a bit error rate (BER), a frame error rate (FER), a block error rate (BER), received signal power (RX Power), or other indicia of channel quality of the WLAN signal. The current CQM sample, CQM(i) or P(i), reflects channel quality of the WLAN at a discrete time instance (e.g., the "ith" received CQM of the WLAN).

In steps 816-426, 830, 836, the following variables are defined:
the number of samples (m) per averaging time window, $m_i(\epsilon_i)$ is the virtual window ($VW_i$) at time instant I,
CQM(i) or P(i) is the ith received CQM of the WLAN,
the current instantaneous CQM estimate (CICQME) at time instant i, CQE(i) or $\hat{P}(i)$, which is the estimated ith received CQM of WLAN,
a metric of the $VW_i$ which is the mean of the current virtualwindow (MCVW) at time instant i, metric ($VW_i$) or $$\overline{\hat{P}(i)},$$

which is the mean of the estimated CQMs of the WLAN in the ith averaging time window,
the gradient of the mean of the virtual window (GMCVW), $\kappa(VW_i)$ or $$\partial \overline{\hat{P}(i)},$$

the threshold for the gradient ($T_g$) of WLAN measurement which indicates a potential entrance to WLAN radio system,
the high threshold ($T_h$) for WLAN measurement which indicates suitability for the WCD to enter WLAN radio system,
the low threshold ($T_l$) for WLAN measurement which indicates unsuitability for the WCD to remain on WLAN radio system,
the mean-square error of a regression line ($\epsilon$) for the CQM, and the maximum tolerable mean-square error of regression line ($\epsilon_{Max}$) for the CQM.

To assist in handover decision making, at step 817, a real-time virtual window (VW) or "time sliding window (TSW)", $m_i(\epsilon_i)$, is defined. The VW is a virtual averaging window in which averaging takes place in real time. The VW is time dependent and is characterized by its size in samples (m). A VW of sample size m at time instant i can be defined as:

$$VW(i) = \{CQE(i-m+1), CQE(i-m+2), \ldots, CQE(i-1), CQM(i)\} \quad \text{(Equation 1)}$$

The variables defining the VW(i) comprise the current instantaneous channel quality measurement, CQM(i), and up to i−m+1 previous estimated channel quality measurements (CQEs).

The size (m) of the VW can be adjusted based on the time-dependent channel quality. A smaller sized VW can be used for better channel conditions, while a larger sized VW can be used for bad channel conditions. The VW eliminates the need to accumulate the channel quality measurement/metric (CQM) samples. As a result, the delay typically associated with this accumulation can be eliminated and the CQM estimation can take place in real time (e.g., it does not require any time because the estimation of the current CQM is done instantaneously.)

At step 818, the WLAN channel quality is estimated for the current CQM in real-time using the VW. A current estimated CQM is defined over the current VW and obtained based on the current CQM and a number of previously determined CQEs within the current VW. As shown in Equations (2) and (3) below, the current instantaneous CQM estimate (CICQME) at time instant (i), CQE(i) or $\hat{P}(i)$, is a function of the current instantaneous CQM, CQM(i) or P(i), the estimated CQMs at previous time instances (e.g., not actual CQM samples) within the VW, and the number of samples (m) per averaging time window. In other words, the current or instantaneous CQM and prior or previous estimated CQMs samples are used to generate the current estimated CQM. The number of samples (m) per averaging time window is adjustable for each particular VW and is a number greater than or equal to 1.

$$\hat{P}(i) = \frac{P(i) + \sum_{k=i-m_i+1}^{k=i-1} \hat{P}(k)}{m_i} \quad \text{Equation (2)}$$

OR $$CQE(i) = \left(CQM(i) + \sum_{k=i-m_i+1}^{k=i-1} CQE(k)\right) / m_i \quad \text{(Equation 3)}$$

The CICQME or "current estimated CQM," CQE(i) or $\hat{P}(i)$, is the estimated ith received CQM for each VW, and provides a first metric based on previous estimated CQMs and instantaneous CQM at that time instant (i). Thus, the CICQME, CQE(i) or $\hat{P}(i)$, uses the system's prior knowledge of estimated CQMs (e.g., CQMs estimated at previous time instances) and its current instantaneous CQM to arrive at a current estimated CQM at the current time instance. Because the previous estimated CQMs are available for all prior time instances, the only information needed to estimate the current CQM is the current instantaneous CQM sample and the estimated CQM at the present time instant can be determined in real time. This is because there is no need to wait to collect CQM samples before calculating an estimated CQM, no time is required to accumulate CQM samples, and the averaging delay in estimating the current CQM can be eliminated.

In conventional handover techniques, the system must collect a number of actual CQM samples (or current instantaneous CQMs), CQM(i) or P(i), over a time period, and then average those CQM samples to determine a current CQM estimate which introduces averaging delay.

By contrast, the VW of step 818 uses previous estimated CQMs to estimate the current CQM at that instant, instead of using the actual CQM samples to estimate the current CQM. Thus, when the current CQM sample is obtained at a given time instant, its corresponding CQM estimation (e.g., the estimated CQM) is known, and the estimation is "instantaneous" or in real time.

Moreover, because the previous estimated CQM samples are used to estimate the current CQM, the number of previous estimated CQM samples used to estimate the current CQM can be increased as needed to improve the accuracy of the estimate of the current CQM without introducing any delay.

As shown in the transfer function (H(z)) of Equation (4), by estimating a current CQM in real-time, the averaging delay can be eliminated thereby improving the speed of the handover decision process. The transfer function (H(z)) of the current instantaneous CQM estimate (CICQME) is a function of number of samples per averaging time window (m). Because number of samples per averaging time window (m) is greater than 1, the transfer function (H(z)) converges since all poles and zeros fall within a unit circle. Thus, the averaging delay can be eliminated thereby helping to ensure a seamless user experience.

$$H(z) = \frac{1}{m_i + \sum_{k=m_i}^{1} z^{-k}}$$ Equation (4)

It would also be desirable to ensure that the handover decision process is stable reducing unnecessary or "ping-pong" type handover situations and reduce or eliminate hysteresis delay. To accomplish this a new metric known as the gradient of the mean of the virtual window (GMCVW) can be defined, as will be discussed below with reference steps 820 and 830.

At step 820, the mean of the current virtual window (MCVW) at a current time instant i, metric (VW$_i$) or $$\overline{\hat{P}(i)},$$

is determined in real-time. To accomplish this, a metric of the VW(i), metric (VW$_i$) or $$\overline{\hat{P}(i)},$$

can be defined by the mean of the CQEs within the VW, as shown in Equations (5) and (6) below.

$$\text{metric}(VW(i)) = \frac{\sum_{j=0}^{m_i-1} CQE(i-j)}{m_i}$$ (Equation 5)

OR $$\overline{\hat{P}(i)} = \frac{\sum_{k=1-m_i+1}^{k=i} \hat{P}(k)}{m_i \Delta t}$$ Equation (6)

The mean of the current virtual window (MCVW) at a current time instant i, metric (VW$_i$) or $$\overline{\hat{P}(i)},$$

represents the mean CQE of the VW at time instant i. As shown in Equations (5) and (6) above, the mean of the current virtual window (MCVW) is a function of the sum of the m estimated CQEs within the VW, number of samples per averaging time window (m), and time difference ($\Delta$t). To explain further, for each VW there is a current instantaneous CQM estimate (CICQME), CQE(i) or $\hat{P}(i)$, and the mean of the current virtual window (MCVW), metric (VW$_i$) or $$\overline{\hat{P}(i)},$$

is the mean of the estimated CQM samples which is the mean of the total CQEs within the VW including the current estimated CQE. In FIG. 5, based on the mean of the current virtual window (MCVW), metric (VW$_i$) or $$\overline{\hat{P}(i)},$$

the average behavior of VW at position 310 is known; the average behavior of VW at position 320 is known, etc. The VW metric, or mean of the CQEs within the VW, is obtained as soon as the current CQE becomes available.

At step 822, the mean of the current virtual window (MCVW), metric (VW$_i$) or $$\overline{\hat{P}(i)},$$

can be used to calculate or determine a VW gradient, $\partial(VW_i)$ or $$\partial \overline{\hat{P}(i)},$$

in real-time. As shown in Equations (7) and (8) below, the gradient of the VW, $\partial(VW_i)$ or $\partial \overline{\hat{P}(i)}$, is a function of the mean of the current virtual window (MCVW) at a current time instant, metric ($VW_i$) or $\overline{\hat{P}(i)}$, the mean of the virtual window at a previous time instant, metric ($VW_{i-1}$) or $\overline{\hat{P}(i-1)}$, and time difference ($\Delta t$). The gradient, $\partial(VW_i)$ or $\partial \overline{\hat{P}(i)}$, describes the trend of the channel quality.

$$\partial \overline{\hat{P}(i)} = \frac{\overline{\hat{P}(i)} - \overline{\hat{P}(i-1)}}{\Delta t} \quad \text{Equation (7)}$$

OR $$\partial(VW\_i) = (metric(VW_i) - metric(VW_{i-1}))/\Delta t \quad \text{(Equation 8)}$$

In contrast to an instantaneous estimated sample gradient (or instantaneous sample change), the gradient of the mean of the virtual window (GMCVW), $\partial(VW_i)$ or $\partial \overline{\hat{P}(i)}$, is a metric of rate of change of the mean of the current virtual window (MCVW), at a current time instant, $\overline{\hat{P}(i)}$.

The VW gradient, $\partial(VW_i)$ or $\partial \overline{\hat{P}(i)}$, can be used to provide a more accurate measure of the VW's stability since the gradient of the mean of the virtual window (GMCVW) measures the rate at which the average behavior of each VW is changing which tends to average out disturbances and can eliminate hysteresis delay. This can help to ensure handover stability when determining whether or not to handover.

As shown in FIG. 5, based on the mean of the current virtual window (MCVW), the average behavior of VW at position 510 is known, the average behavior of VW at position 520 is known, etc. The gradient of the mean of the virtual window (GMCVW), $\partial(VW_i)$ or $\partial \overline{\hat{P}(i)}$, is represented by the lines 512, 522, 532, 542 and 552, which indicate how much the average behavior of VW is changing at position 510, how much average behavior of VW is changing at position 520, how much average behavior of VW is changing at position 530, etc.

Figure 8B:
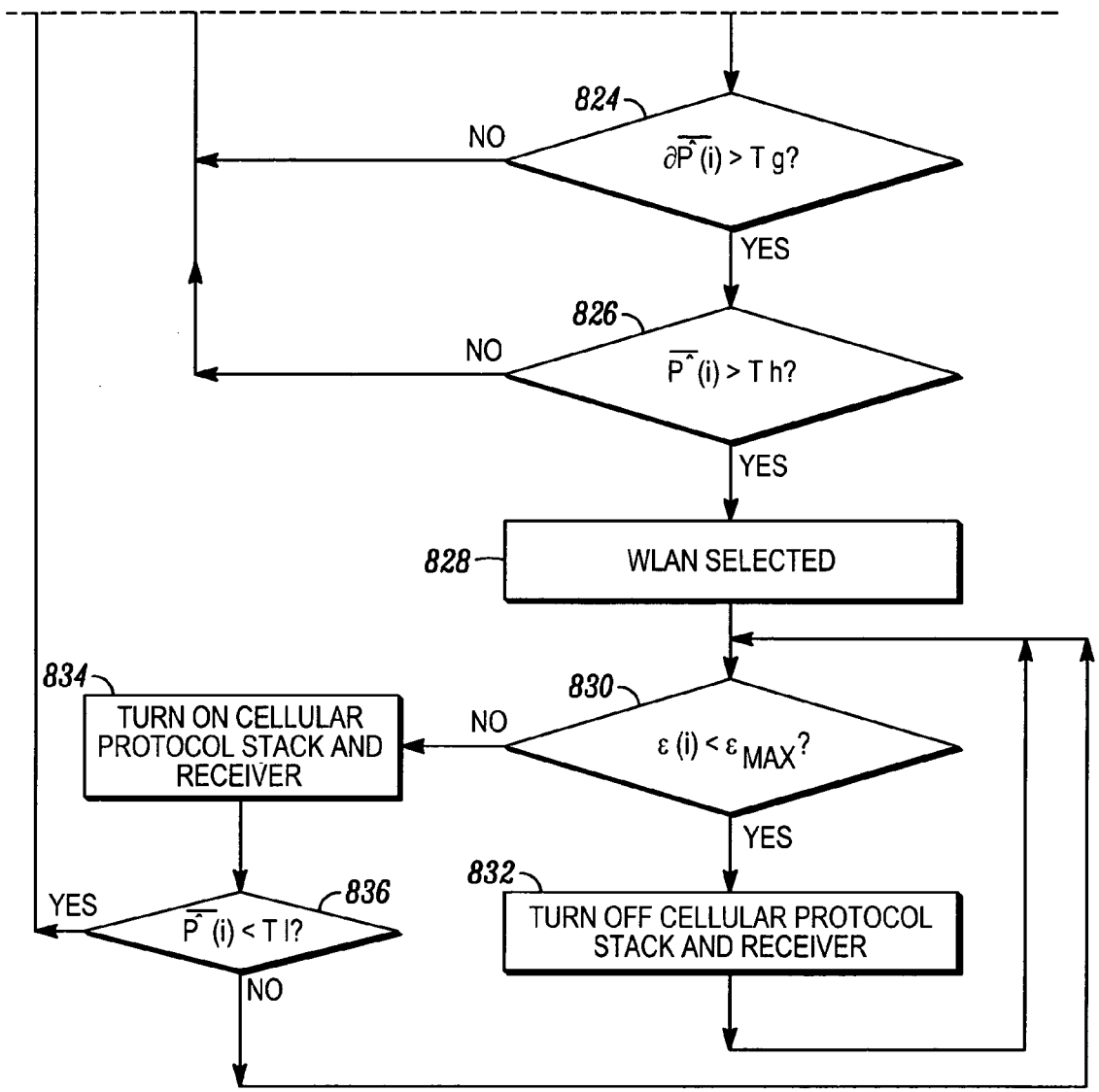

Referring to FIG. 8B, at step 824, the gradient of the mean of the estimated WLAN channel quality samples, $\partial(VW_i)$ or $\partial \overline{\hat{P}(i)}$, can be compared to the gradient threshold ($T_g$). The gradient threshold ($T_g$) of the WLAN measurement indicates a potential entrance of the WCD into WLAN radio system. The WCD decides that the WLAN is a candidate WLAN for handover if the gradient of the mean of the estimated WLAN channel quality samples, $\partial(VW_i)$ or $\partial \overline{\hat{P}(i)}$, is greater than the gradient threshold (Tg), and proceeds to step 826. Thus, the WCD can determine whether the change of estimated CQM, $\partial(VW_i)$ or $\partial \overline{\hat{P}(i)}$, is fast enough for the WCD to further consider a handover decision.

At step 826, the mean of the estimated WLAN channel quality samples (or the mean of the current virtual window (MCVW)), metric ($VW_i$) or $\overline{\hat{P}(i)}$, is compared to a high threshold ($T_h$) for the candidate WLAN. The high threshold ($T_h$) for WLAN measurement indicates suitability for the WCD to enter the candidate WLAN.

If the WCD determines that the mean of the current virtual window (MCVW) at a current time instant, metric ($VW_i$) or $\overline{\hat{P}(i)}$, is greater than the high threshold ($T_h$), (e.g., the WLAN signal is strong enough), then at step 828 the WCD determines that the candidate WLAN is suitable for handover and selects the candidate WLAN as a "selected" WLAN.

The WCD also determines a regression line for the CQM for the selected WLAN. After the WCD selects the WLAN as a selected WLAN, a mean-square error of regression line ($\epsilon$) and the maximum tolerable mean-square error of regression line ($\epsilon_{Max}$) are determined. The mean-square error of regression line ($\epsilon$) reflects changes in mobility of the WCD once the WCD is operating in the selected WLAN. In some situations, the WLAN signal may not be adequate and it becomes prudent for the WCD to continue operating in conjunction with the cellular system. To ensure that it is still desirable to be operating in the selected WLAN, at step 830, the mean-square error of regression line ($\epsilon$) is compared to the maximum tolerable mean-square error of regression line ($\epsilon_{Max}$).

If the WCD determines that the mean-square error of regression line ($\epsilon$) is less than the maximum tolerable mean-square error of regression line ($\epsilon_{Max}$) at step 830, then at step 832, the WCD decided that its mobility is negligible and that it should continue operating on the selected WLAN. At this time, the WCD keeps its WLAN processor and receiver and its WLAN software protocol stacks operational, and turns off its cellular baseband processor and receiver and its GSM, GPRS, CDMA, UMTS or WCDMA software/protocol stacks to conserve power. The process then loops back to step 830, where the WCD continues to compare the mean-square error of regression line ($\epsilon$) to the maximum tolerable mean-square error of regression line ($\epsilon_{Max}$).

By contrast, if the WCD determines that the mean-square error of regression line ($\epsilon$) is greater than the maximum tolerable mean-square error of regression line ($\epsilon_{Max}$) at step 830, then at step 834, the WCD can determine that its mobility is significant and that it should discontinue operating on the selected WLAN. At this time, the WCD turns on its cellular baseband processor and receiver and its GSM, GPRS, CDMA, UMTS or WCDMA software protocol stacks, and turns off its WLAN processor and receiver and its WLAN software protocol stacks to conserve power.

At step 836, the WCD determines whether the mean of the estimated WLAN channel quality samples, metric ($VW_i$) or $$\overline{\hat{P}(i)},$$

is less than a low threshold ($T_i$) for WLAN measurement. The low threshold ($T_i$) indicates unsuitability for mobile terminal remain on WLAN radio system. If at step 836, the mean of the estimated WLAN channel quality samples, metric ($VW_i$) or $$\overline{\hat{P}(i)},$$

is greater than the second threshold, then the process returns to step 830, where the WCD continues to compare the mean-square error of regression line ($\epsilon$) to the maximum tolerable mean-square error of regression line ($\epsilon_{Max}$). By contrast, if the mean of the estimated WLAN channel quality samples, metric ($VW_i$) or $$\overline{\hat{P}(i)},$$

is less than the second threshold at step 836, then the process returns to step 810 and a connection to the cellular radio system is maintained.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing a relationship between different elements do not imply that a direct physical connection must be made between these elements. For example, two elements may be connected to each other physically, electronically, logically, or in any other manner, through one or more additional elements, without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. In a wireless communication device, a method for deciding when to handover a communication device from a wireless communication network to a wireless local area network (WLAN) in real-time, the method comprising:
   measuring samples of WLAN channel quality to generate a plurality of first channel quality measurements;
   estimating channel quality of the WLAN for each sample based on the plurality of first channel quality measurements to generate a plurality of first channel quality estimates;
   storing the first channel quality estimates prior to a first time instant;
   measuring a second sample of WLAN channel quality at the first time instant to generate a second channel quality measurement;
   defining a virtual window at the first time instant, wherein the virtual window is defined based on variables comprising a number of samples, the second channel quality measurement, and the plurality of first channel quality estimates; and
   using the virtual window to estimate channel quality of the WLAN at the first time instant based on the second channel quality measurement and the plurality of first channel quality estimates to generate a second channel quality estimate.

2. A method according to claim 1, farther comprising:
   determining the mean of the virtual window at a previous time instant prior to the first time instant;
   determining the mean of the virtual window at the first time instant, wherein the mean of the virtual window comprises the mean of the second channel quality estimate and the plurality of the first channel quality estimates; and
   determining a gradient of the virtual window in real-time based on the mean of the virtual window at the first time instant and mean of the virtual window at the previous time instant.

3. A method according to claim 2, farther comprising:
   comparing the gradient of the mean to a gradient threshold;
   identifying the WLAN as a candidate WLAN for handover if the gradient of the mean is greater than the gradient threshold;
   comparing the mean to a first threshold; and
   selecting the candidate WLAN as a selected WLAN suitable for handover if the mean is greater than the first threshold.

4. A method according to claim 3, farther comprising:
   determining a regression line for the channel quality measurement for the selected WLAN;
   determining a mean square error of the regression line and a maximum mean square error of the regression line;
   comparing the mean square error of the regression line to the maximum mean square error of the regression line; and
   deciding to handover to the selected WLAN if the mean square error is less than the maximum mean square error.

5. A method according to claim 4, farther comprising:
   maintaining a connection to the wireless communication network if the mean square error for the regression line is greater than the maximum mean square error.

6. A method according to claim 5, farther comprising:
   determining whether the mean of the virtual window at the first time instant is less than a second threshold.

7. A method according to claim 6, wherein the mean square error is a first mean square error, wherein the maximum mean square error is a first maximum mean square error, and if the mean of the second channel quality measurement and the plurality of first channel quality estimates at the first time instant is greater than the second threshold, then:
   determining a second regression line of the channel quality measurement for the selected WLAN;
   determining a second mean square error of the second regression line and a second maximum mean square error of the second regression line;
   comparing the second mean square error for the second regression line to the second maximum mean square error for the second regression line; and
   deciding to handover to the selected WLAN if the second mean square error is less than the second maximum mean square error.

8. A method according to claim 6, further comprising:
   maintaining a connection to the wireless communication network if the mean of the virtual window at the first time instant is less than the second threshold.

9. A communication device operable in a wireless communication network and a wireless local area network (WLAN) and adapted to make a handover decision in real-time, comprising:
   a measurement module configured to measure samples of WLAN channel quality and generate a plurality of first channel quality measurements based on the samples;
   a processor configured to estimate channel quality of the WLAN for each sample based on the plurality of first channel quality measurements and to generate a plurality of first channel quality estimates based on the first channel quality measurements;
   a memory configured to store the first channel quality estimates prior to a first time instant,
   wherein the measurement module is further configured to measure a second sample of WLAN channel quality at the first time instant to generate a second channel quality measurement based on the second sample, and
   wherein the processor is configured to define a virtual window at the first time instant, wherein the virtual window is defined based on variables comprising a number of samples, the second channel quality measurement, and the plurality of first channel quality estimates, and
   wherein the processor is configured to use the virtual window at the first time instant to estimate channel quality of the WLAN at the first time instant based on the second channel quality measurement and the plurality of first channel quality estimates to generate a second channel quality estimate.

10. A communication device according to claim 9, wherein the processor is further configured to determine the mean of the virtual window at a previous time instant prior to the first time instant, determine the mean of the virtual window at the first time instant, wherein the mean of the virtual window comprises the mean of the second channel quality estimate and the plurality of the first channel quality estimates, and wherein the processor is further configured to determine a gradient of the virtual window in real-time based on the mean of the virtual window at the first time instant and mean of the virtual window at the previous time instant.

11. A communication device according to claim 10, wherein the processor is further configured to identify the WLAN as a candidate WLAN for handover if the gradient of the mean is greater than a gradient threshold.

12. A communication device according to claim 11, wherein the processor is further configured to select the candidate WLAN as a selected WLAN suitable for handover if the mean is greater than a first threshold.

13. A communication device according to claim 12, wherein the processor is further configured to determine a regression line of the channel quality measurement for the selected WLAN, determine a mean square error of the regression line and a maximum mean square error of the regression line, and decide to handover to the selected WLAN if the mean square error is less than the maximum mean square error.

14. A communication device according to claim 13, wherein the processor is further configured to maintain a connection to the wireless communication network if the mean square error for the regression line is greater than the maximum mean square error.

15. A communication device according to claim 14, wherein the processor is further configured to determine whether the mean of the virtual window at the first time instant is less than a second threshold.

16. A communication device according to claim 15, wherein the mean square error is a first mean square error, wherein the maximum mean square error is a first maximum mean square error, and if the mean of the virtual window at the first time instant is greater than the second threshold, wherein the processor is further configured to determine a second regression line of the channel quality measurement for the selected WLAN, a second mean square error of the second regression line and a second maximum mean square error of the second regression line, and to decide to handover to the selected WLAN if the second mean square error is less than the second maximum mean square error.

17. A communication device according to claim 15, wherein the processor is further configured to maintain a connection to the wireless communication network if the mean of the virtual window at the first time instant is less than the second threshold.

18. A method in a wireless communication device, comprising:
   storing first channel quality estimates prior to a first time instance, wherein the first channel quality estimates are based on channel quality measurements made prior to a first channel quality measurement;
   measuring channel quality at the first time instance to generate the first channel quality measurement;
   defining a virtual window at the first time instance, wherein the virtual window is defined based on variables comprising the first channel quality estimates and the first channel quality measurement; and
   using the virtual window to generate a second channel quality estimate at the first time instance by estimating channel quality at the first time instance using the first channel quality estimates and the first channel quality measurement to generate the second channel quality estimate at the first time instance.

19. A method according to claim 18, farther comprising:
   determining a gradient of the virtual window; and
   making a handover decision based on the channel quality estimate and the gradient of the virtual window.

* * * * *